Nov. 18, 1969  R. B. W. COOKE  3,478,425
METHOD OF MAKING AN ELECTRICAL ASSEMBLY
Filed Jan. 16, 1967
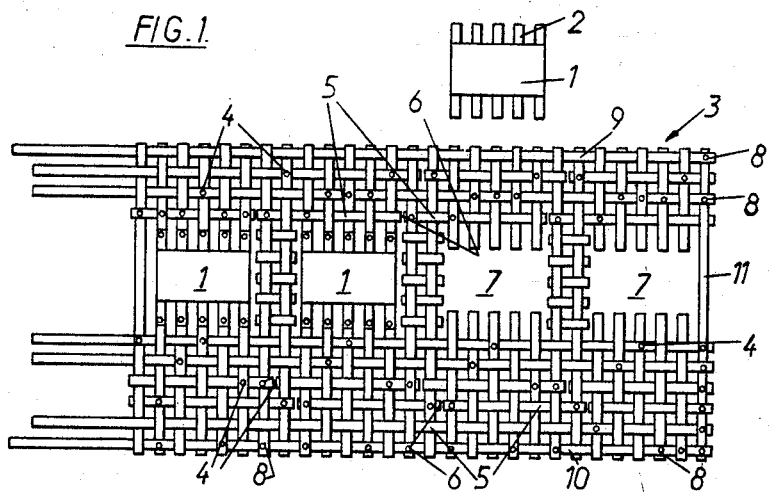
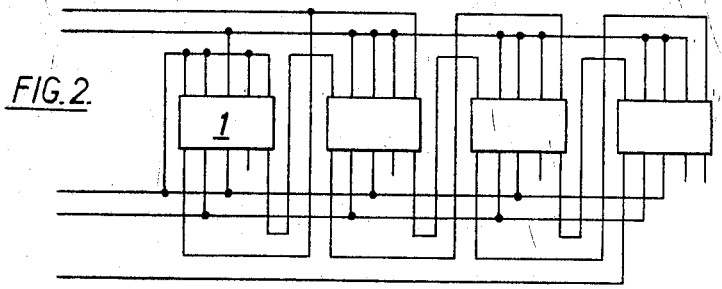
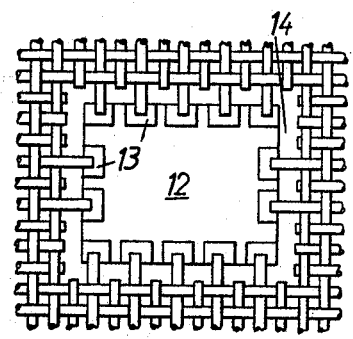
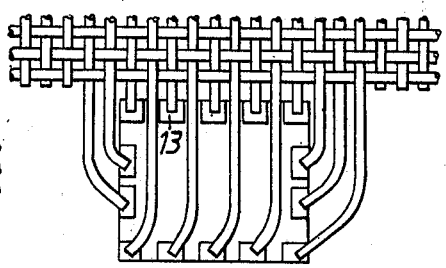
Inventor
REGINALD B. W. COOKE
By A. L. Lessler
Attorney

United States Patent Office 3,478,425
Patented Nov. 18, 1969

3,478,425
METHOD OF MAKING AN ELECTRICAL ASSEMBLY
Reginald Benjamin William Cooke, Bishop's Stortford, England, assignor to International Standard Electric Corporation, New York, N.Y., a corporation of Delaware
Filed Jan. 16, 1967, Ser. No. 609,454
Claims priority, application Great Britain, Jan. 31, 1966, 4,137/66
Int. Cl. H01b 13/00; H05k 3/00
U.S. Cl. 29—624    11 Claims

ABSTRACT OF THE DISCLOSURE

A matrix of electrical conductors which have been interconnected at selected cross points by wiring the conductors together at said cross points. After wiring, the unbonded cross points are insulated by oxidation, e.g., by anodizing the wires at the cross points to produce surface oxide insulating layers on said wires.

---

This invention relates to electrical wiring assembly.

The use of wiring networks as typified by a woven wire mat for the purpose of interconnection between electrical equipments and assemblies has a wide range of application, from large racks of equipment to miniature assemblies such as microcircuits.

A number of methods so far used for such interconnection purposes entail welding selected wire cross-points, through various forms of insulation, in general by means of heated welder electrodes, or by physically cracking the insulation by pressure of the welder electrode. Either all the wires are insulated or there may be the limitation that only the wires in one direction can be insulated, the wires in the other direction remaining bare.

Many forms of insulation such as polythene, PVC, silicone rubber, enamelled, glass-covered and solderable enamel have been investigated, but usually suffer from either contamination of some kind at the weld points, or the danger of insulation damage during the weaving of the wires, or subsequent operations, particularly when dealing with very small sizes of mesh for microcircuits.

According to the invention there is provided a method of manufacturing an interconnected wiring assembly, which includes the steps of providing an arrangement of a multiplicity of crossing bare wires, bonding together the wires at selected cross-points to form a desired pattern of electrical interconnections, and then treating the surface of the wires so as to cause the formation of an electrically insulating surface layer between the wires at the unbonded cross-points.

Preferred embodiments of the invention will now be described with reference to the accompanying drawings, in which:

FIG. 1 shows an intermediate stage of an electrical wiring assembly and some of the associated electrical circuit elements interconnected thereby, FIG. 2 is the equivalent circuit diagram of the final assembly of FIG. 1, FIGS. 3 and 4 show alternative methods of attaching electrical circuit elements to an electrical wiring assembly.

According to a preferred embodiment of the invention the treatment of the intersecting wires at the unbonded cross points, in order to produce an electrically insulating surface layer between said wires at said cross points, involves the step of oxidizing at least one and preferably both of the bare wires at each unbonded cross point. While the preferred embodiment described herein involves the step of performing such oxidation by anodizing the wires, it should be clearly understood that the invention is intended to cover other forms of oxidation.

In FIG. 1 which is a four stage shift register using semiconductor integrated circuits with the circuit elements of each stage contained in a "flat pack" encapsulated unit 1 having a standard configuration with ten terminal conductors 2, interconnection between the units, and external connection to input, output and bias voltages, is provided by a woven aluminium wire mat 3 on which has been carried out a series of selective welds of certain wire cross-points, selective severing of the wires, and anodising the wire.

The required interconnections and external connections are as shown in FIG. 2.

Initially, the mat 3 of bare aluminium wire has the wires at cross-points such as 4 welded together as indicated by the circles, to form electrical interconnections between the wires at the respective welded cross-points, the pattern of interconnections so formed corresponding to those as shown in FIG. 2.

Where a single length of wire such as 5 is to separately interconnect more than one set of terminals or welded cross-points, the wire is severed as at 6. Selective severing of the wires is effected according to the requirements of FIG. 2.

In this embodiment the units are located within the mat, and accordingly to accommodate the units apertures such as 7 are formed in the mat by cutting and removing portions of the wire of appropriate size.

It will be seen that as so far described the bare aluminium wire mat has been processed to provide an interconnection pattern by selective welding at crosspoints, and cutting away where necessary, at this stage ignoring all requirements of insulation.

In addition to welding the cross-points required to give the circuit interconnections of FIG. 2, welding is performed where necessary as indicated by circles such as 8 on the upper and lower horizontal wires 9 and 10 of the mat of FIG. 1 and on the right hand vertical wires 11 to establish continuous electrically conducting paths to all the remaining wires not already so connected.

The upper and lower wires 9 and 10, now electrically connected to all the other wires in the mat, are connected to the anode of an anodising equipment and the mat inserted in an electrolytic bath containing for example an aqueous solution of 10 fluid ounces of sulphuric acid per gallon and 2 fluid ounces of oxalic acid per gallon. With a bath temperature of 48°–52° F., a current density of 25–40 amperes per square foot, and a voltage of 15 volts, the mat is subjected to anodisation for up to 40 minutes.

The anodising treatment causes the formation of a surface insulating layer around the wires, between the wires at all the unbonded cross-points, and over the ends of the severed wires. The anodising treatment is continued until sufficient insulation is provided at the unbonded crosspoints, the bonded cross-points still retaining an electrical joint. If necessary, a post-anodising treatment for sealing the anodised surface is then carried out by established processes.

The thickness of the insulating film can be varied over a wide range by control of the anodising process. For maximum breakdown voltage and lowest capacitance at an insulated cross-point the anodised film would be made as thick as possible, but a limit is reached when the effective cross-section of the remaining conductor approaches the required current carrying capacity.

The ends of the wires surrounding the apertures 7 to contain the units 1 may be masked before the anodising treatment, or the anodised film may be removed from these wire ends after the anodising treatment, for example, by hydrochloric acid. The terminals of the units are then welded to appropriate bare wire ends surrounding the apertures. Alternatively the welding may be carried out so as to effect an electrical bond between the unit terminals and the insulated wire ends by penetrating the anodised film on the wire ends, for example by the use of ultrasonic welding.

Either before or after attachment of the flat pack units, the upper and lower wires 9 and 10 and the right hand vertical wire 11 are removed from the mat, to give the final circuit assambly of FIG. 2.

FIG. 3 shows a similar attachment technique for an assembly of electrical circuit elements formed as a monolithic structure or a thin film circuit on a substarte 12 with conducting lands 13 forming the terminals. The ends of the wires surrounding an aperture 14 for accommodating the substrate are welded directly to the respective lands.

In FIG. 4, the or each assembly of electrical circuit elements is positioned at the side of the mat, and appropriate wires of the mat are extended as shown and are welded to respective conducting lands 13. A similar side attachment method may be used for the flat pack units 1.

In some cases, for example where monolithic circuit chips are to be attached, it is possible to attach the chips to the wires of the mat before the anodising treatment, the attached chips being suitably masked if necessary for protection during the subsequent anodising treatment to form the insulating surface layer on the wires.

As a further step the complete assembly of mat and attached circuit elements may be potted in an insulating resin or the like. Prior to such potting, or as a final step in itself, the interconnecting mat may be formed with a desired configuration, as by corrugating or other shaped bending, for example to reduce the volume occupied thereby. The curvature of the wires should not be sharp as to allow possible damage to the insulating layer. However, it is preferred to effect any such bending before the anodising treatment if possible.

The above described forms of wiring interconnection are highly suited to microcircuits, such as for mounting transistor or integrated circuit chips, so eliminating individual packaging of siilcon chips, resulting a great saving in costs, and improved reliability by the reduction in the number of joints involved.

The woven wire mat can be very small in pitch and the space taken by the insulation is negligible. With suitable choice of mesh this form of interconnection is suitable for autoproduction.

It will be appreciated that large rack or subrack equipments may also be interconnected or described above, particularly by using the side attachment method of FIG. 4. In addition to the mounting and interconnection of a|semblies of electrical circuit components, it is also possible to interconnect single electrical circuit elements. Thus resistors and/or diodes may be interconnected in a matrix arrangement by bonding the terminal wires thereof to appropriate spaced points on a wire mat. This may be done either by interconnecting the component between two different wires, or between two spaced points on the same wire and then severing the wire in between the component attachment points. It is not always necessary when mounting elements or element assemblies on the mat to cut out apertures in the mat. Severing of certain wires may however be necessary in order to effect proper electrical path layout.

The method as described is not restricted to the use of aluminium wires, and any material on which an insulating layer can be formed by a suitable surface reaction can be used. For example tantalum and titanium can be anodised and these would be suitable for the method described.

It is to be understood that the foregoing description of specific examples of this invention is made by way of example only and is not to be considered as a limitation on its scope.

I claim:

1. A method of manufacturing an interconnected electrical assembly comprising the steps of providng an arrangement of wire mesh having a multiplicity of crossing bare electrical conductors, mechanically and electrically bonding together selected conductors at predetermined cross points to form a desired pattern of electrical interconnections and subsequently subjecting at least one of said bare conductors at each unbonded cross point to a controlled oxidation process for forming an electrically insulating surface layer between said conductors at the unbonded cross points, and mechanically and electrically connecting certain of said conductors to electrical components.

2. A method according to claim 1 comprising the additional step of severing particular ones of said conductors.

3. A method according to claim 1 comprising the additional step of masking selected portions of said conductors prior to the step of forming said insulating layer.

4. A method according to claim 1 comprising the additional step of removing selected portions of said insulating layer.

5. A method according to claim 1 comprising the additional step of bonding the terminals of an electrical circuit element to predetermined areas of selected conductors in said arrangement.

6. A method according to claim 5 wherein said bonding step is performed by welding.

7. A method according to claim 5 comprising the additional step of masking said predetermined areas prior to the step of forming said insulating layer.

8. A method according to claim 1 wherein said oxidizing step includes anodizing said at least one conductor.

9. A method according to claim 8 wherein said at least one conductor comprises a metal selected from the group consisting of aluminum, tantalum and titanium.

10. A method according to claim 1 wherein said arrangement comprises first and second arrays of mutually transverse wires, the wires of each array being substantially parallel to each other.

11. A method according to claim 2 wherein said particular conductors are severed before the formation of said insulating layer, and wherein said insulating layer is formed over the severed extremities of said particular conductors.

References Cited

UNITED STATES PATENTS

| 2,585,037 | 2/1952 | Robinson et al. | 29—605 XR |
| 2,915,686 | 12/1959 | Schubert | 29—604 XR |
| 3,038,105 | 6/1962 | Brownfield | 317—101 |
| 3,169,892 | 2/1965 | Lemelson | 29—578 |
| 3,255,047 | 6/1966 | Escoffery | 317—101 |

JOHN F. CAMPBELL, Primary Examiner

R. W. CHURCH, Assistant Examiner

U.S. Cl. X.R.

29—163.5, 626, 628, 629; 174—68.5; 204—24, 27; 317—101; 339—17